Figure 2:
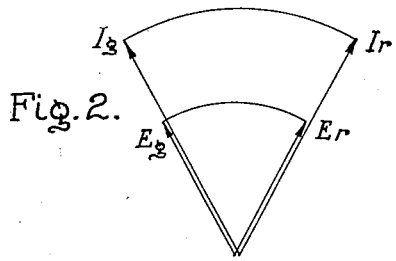

Aug. 8, 1933.  L. F. BLUME  1,921,723

ELECTRICAL TRANSMISSION SYSTEM

Filed March 25, 1931

Inventor:
Louis F. Blume,
by Charles V. Mullan
His Attorney.

Patented Aug. 8, 1933

1,921,723

UNITED STATES PATENT OFFICE 1,921,723

ELECTRICAL TRANSMISSION SYSTEM

Louis F. Blume, Pittsfield, Mass., assignor to General Electric Company, a Corporation of New York Application March 25, 1931. Serial No. 525,222

11 Claims. (Cl. 172—237)

My invention relates to electrical transmission systems and particularly electrical alternating current power transmission systems.

In the present state of the art practically all important electrical power transmission systems are so called synchronous-to-synchronous systems involving the use of synchronous generators and motors between which alternating current electrical energy is transmitted at high voltage over transmission lines through the use of step up and step down power transformers. For various reasons, such as the consolidation of operating companies or the desire of independent companies to form a so-called "superpower" system, or because of the remoteness of new load centers from locations where power may be most economically generated, the trend seems to be toward greater and greater distances of synchronous-to-synchronous transmission.

Theoretical studies of long distance synchronous-to-synchronous transmission systems together with the practical knowledge of power limits and stability of shorter systems have shown that at the highest present day transmission voltages, and at the usual commercial frequency of 60 cycles, the distance of simple straightway synchronous-to-synchronous transmission is limited by economic requirements as to the amount of power transfer to approximately 300 miles if the system is to be stable. The most important reasons for this are that the increased length of the transmission line increases the impedance between the synchronous terminal apparatus so that the voltage drop in the line increases for a given value of power transfer. As the maximum power transferable between synchronous machines increases as a function of the product of the machine voltages and decreases as a function of the impedance between the machines it is obvious that the length of transmission will have a definite limit for a given value of power transfer between given machines.

In the past various ways of increasing the distance of transmission for stable operation of synchronous-to-synchronous systems have been devised. One of these ways comprises providing the synchronous machines with special quick acting voltage regulators which act to hold the machines in synchronism while they are operating on the unstable part of their operating characteristics. Another way is to modify the usual standard transmission line so as to reduce its effective impedance. Most of these ways involve the use of expensive special auxiliary apparatus which of course is a handicap to their widespread adoption.

In accordance with one aspect of my invention I provide an alternating current transmission system which is adapted for the long distance transmission of electrical power between substantially constant voltage synchronous machines and which is characterized by the fact that the transmission line is operated at a fixed ratio of voltage to current over a wide range of power flow therethrough, this ratio, which is determined by the constants of the line, being such that the reactive energy associated with the line which is due to the shunt capacitance of the line, and which is a function of the line voltage for any given line, is equal to the reactive energy associated with the line which is due to the series self-inductance of the line, and which is a function of the line current for any given line. The way I prefer to attain this result is to provide the power transformers which are connected between the substantially constant voltage synchronous machines and the transmission line with means for varying their ratio of transformation automatically with changes in power transfer over the line. Power transformers, whose ratios of transformation may be changed under load, are now making their appearance on the market and as the automatic control means which I provide is relatively simple and inexpensive it will be apparent that the above principles of operation of my invention may be applied to transmission systems without undue expense.

With a transmission system operating in the above manner the power factor will be the same at all points along the line because between any two points the difference in phase angle of the voltage, which is caused by the inductive reactance voltage drop, will be equal to the difference in phase of the current, which is caused by the variation in charging current: With a unity power factor load, the power factor throughout the line will be unity. The line will thus act as a pure resistance, and as the resistance of an ordinary line is comparatively low with respect to its reactance the total line impedance will be low. The power limits for synchronous transmission will therefore be considerably increased and as a corollary to this, the distance of transmission for given intermediate values of power transfer will be increased.

It has long been known that when the receiving end of an alternating current circuit has an impedance equal to the characteristic or surge impedance of the circuit that energy will be transmitted without reflection, in the form of a pure travelling wave. In other words, the power factor throughout the line will be constant, which means that the phase displacement of current in the line due to charging current equals the phase displacement of voltage due to the inductive reactance voltage drop in the line, between any two points on the line. This is merely another way of saying that the leading energy of the line equals the lagging energy of the line. If these conditions are to be maintained for different values of power transfer it will mean that the ratio of line voltage to current must be maintained constant.

Electrical transmission of energy under the above conditions may be called wave transmissions and it will thus be seen that the above-described aspect of the present invention relates to a special practical application of the broad principle of wave transmission, whereby variable amounts of power may be synchronously transmitted in this manner over any ordinary transmission line between ordinary constant voltage synchronous machines by means of special intermediate apparatus. In an application of Ernst F. W. Alexanderson, Serial No. 415,307, filed December 19, 1929, and assigned to the assignee of the present application, there is disclosed and claimed another special application of the broad principle of wave transmission whereby power is non-synchronously unidirectionally transmissible over an ordinary line through control of the transmitter voltage.

From another aspect, my invention has to do with the voltage regulation of alternating current transmission systems, whether long or short. From this point of view it is not necessary that the capacitive and inductive energies of the line be equal but it is necessary that a given ratio, which is dependent upon power factor as well as upon the line constants between voltage and current be maintained constant during variations in power flow in the system.

The application of my invention for voltage regulation generally can be understood when it is realized that, if both the power factor and ratio of voltage to current of the line are maintained constant, but one vector diagram will represent the phase relations and relative magnitude relations of the current and voltage at each end of any given line for all values of power transfer. Therefore, if for any line between and including the limiting cases of lines with no capacitance or no inductance, respectively, the power factor and the fixed ratio of current to voltage are both so chosen that at any given value of power flow through the line the voltage at the transmitting and receiving ends are equal, then they will be equal for all other values of power flow, the usually relatively small resistance voltage drop being neglected. Instead of preventing voltage drop the line may also be made to operate with a fixed percentage voltage drop, which percentage will be determined by the power factor and ratio of voltage to current.

The first described aspect of my invention, namely, the wave transmission aspect wherein the capacitive and inductive reactive energies associated with the line are equal is but a special case of the application of the principles of my invention. While this condition is advantageous for long lines, as pointed out above, it is possible that for short or moderate length lines it will not be necessary to keep these energies equal. However, in such cases very good voltage regulation may be attained if the power factor and voltage to current ratio are properly chosen and then maintained constant by suitable means.

An object of my invention is to provide a new and improved alternating current transmission system.

Another object of my invention is to provide a practical system for operating alternating current transmission systems under the conditions of wave transmission.

A further object of my invention is to provide means for improving the voltage regulation of alternating current transmission lines.

An added object of my invention is to provide means for increasing the stability and power limits of long synchronous-to-synchronous transmission systems.

My invention will be better understood from the following description taken in connection with the accompanying drawing, and its scope will be pointed out in the appended claims.

Figure 3:
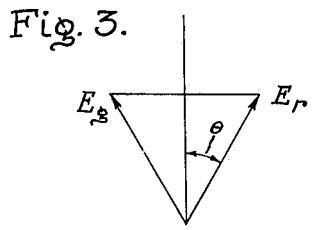
Figure 1:
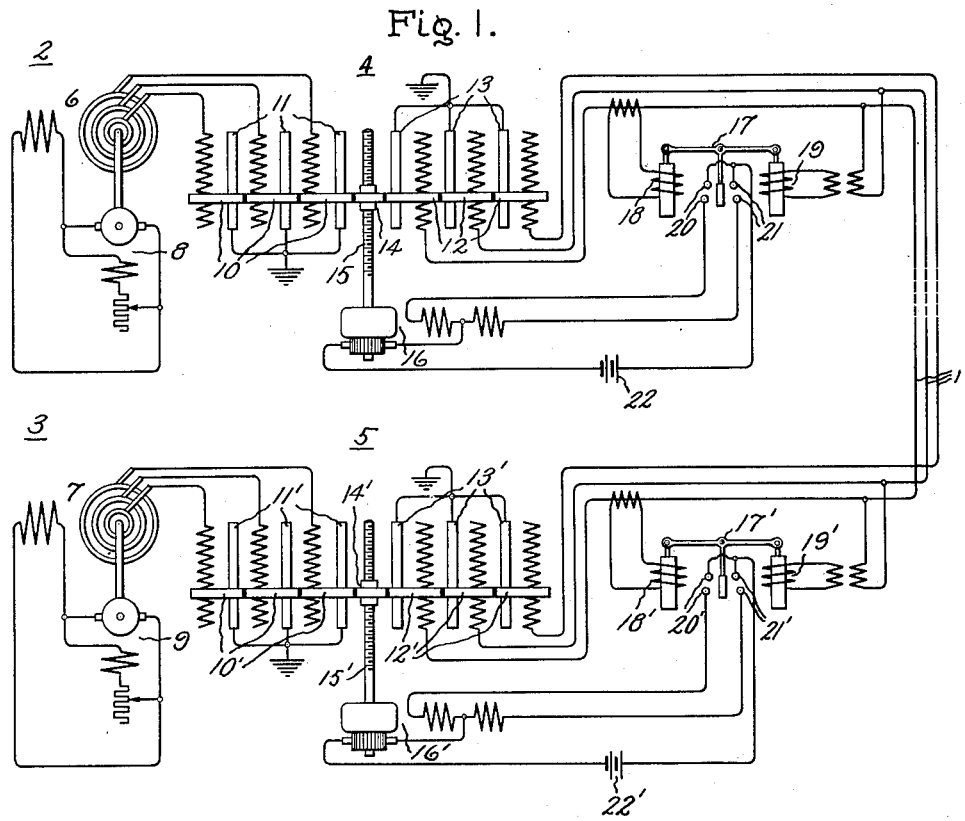
Figure 4:
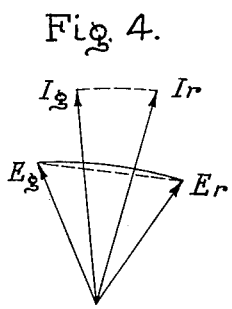
Figure 5:
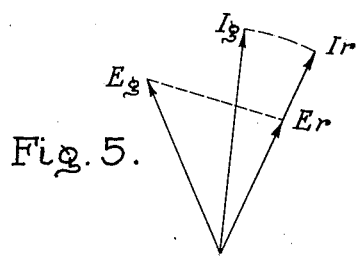

In the drawing, Fig. 1 is a diagrammatic representation of an embodiment of my invention; Fig. 2 is a vector diagram of the voltage and current relations in the line of Fig. 1 when the line is balanced for wave transmission; Fig. 3 is a vector diagram of the relations in Fig. 1 when the capacitive energy associated with the line is zero and the power factor is adjusted for zero line voltage drop, while Figs. 4 and 5 represent conditions in the line of Fig. 1 when there is a moderate amount of capacitive energy associated with the line and when the power factor is adjusted for zero line drop and a constant per cent line drop respectively.

Referring now to Fig. 1 of the accompanying drawing, wherein I have illustrated diagrammatically a specific embodiment of my invention, 1 represents an electrical transmission line, preferably but not necessarily a long line of standard design, to whose terminals are connected generating and receiving stations 2 and 3 through power transformers 4 and 5 respectively.

Stations 2 and 3 may contain any sort of alternating current generating and power absorbing translating devices. In the arrangement illustrated it will be assumed that they are conventional stations containing synchronous machines 6 and 7 with their attendant exciters 8 and 9 respectively for providing the necessary excitation. Although not shown, it will be assumed that these machines are provided with the conventional voltage regulators for holding their voltages constant under varying load conditions. In fact, stations 2 and 3 may be taken to represent typical alternating current central stations.

Transformers 4 and 5 are variable ratio power transformers. It is immaterial to my invention what particular method is used for getting a variable ratio, thus mechanical tap changing, as in the illustrated embodiment, or varying the inductive relation of the windings, as in an induction voltage regulator or tap changing by means of grid controlled electric power valves all come within my invention in its broadest aspects. In the arrangement illustrated, transformer 4 is a three phase step up transformer whose constant low voltage primary winding is star connected through a set of movable contact fingers 10 which slide on fixed contacts 11. As contact fingers 10 move upwardly more and more turns of the primary winding are taken out of the circuit and as contact fingers 10 move downwardly more and more turns are connected in circuit. The variable high voltage secondary winding is also star connected through contact fingers 12 which slide on contacts 13. As contacts 12 move upwardly more and more of the secondary winding turns are connected to line 1 and as they move downwardly more and more turns are disconnected from circuit 1. Although the windings have been shown star-connected it will of course be obvious to those skilled in the art that they might also be mesh-connected if desired. Both sets of contact fingers 10 and 12 are arranged to be moved up and down together by any suitable means such as the traveling nut and a screw arrangement shown. In this arrangement a nut 14 is in threaded engagement with a screw 15 which is rotated by a reversible pilot motor 16. Thus if the motor 16 turns in one direction contact fingers 10 and 12 will rise together to increase the line voltage while when the motor operates in the other direction the contact fingers 10 and 12 descend together to lower the line voltage.

Transformer 5 is the same as transformer 4 except that it acts to step the line voltage down instead of up. Its ratio is changed by the same kind of means as in transformer 4 and consequently a detailed description is believed unnecessary. Similar parts in transformer 5 to those in transformer 4, are designated by primed reference characters of transformer 4.

Pilot motor 16 is controlled by a device which responds to changes in the ratio of voltage to current in line 1. In the illustrated embodiment this device is a differential relay having a normally balanced movable contact assembly 17 which is acted upon by coils 18 and 19 which are connected to be energized in accordance with the magnitude of the line current and voltage respectively. Whenever the ratio of voltage to current departs from a predetermined value the assembly 17 is unbalanced with the result that its movable contact bridges one of the other pairs of fixed contacts 20 or 21 thereby to complete an energizing circuit for motor 16 through one of its reversing field windings and a source 22. Corresponding elements of the control assembly for transformer 5 are designated by corresponding primed reference characters.

The operation of the illustrated embodiment during balanced conditions is as follows: Assume that stations 2 and 3 are operating in the usual manner in that station 2 is transmitting a given amount of power through line 1 to station 3. Assume further that the usual regulating apparatus (not shown) is functioning to hold constant voltage on the machines and for the sake of simplicity, that they are operating at unity power factor. The differential relays associated with the transformers 4 and 5 are so adjusted that they are balanced when the ratio of line voltage to line current is such that the reactive energy associated with the line which is due to the shunt capacitance of the line is equal to the reactive energy associated with the line which is due to the series self inductance of the line. Another way of defining this ratio is to say that between any two points on the line the amount of phase shift of voltage due to the inductive reactance drop in the line is equal to the amount of phase shift in the current due to the charging current between these points. This condition is represented by the vector diagram of Fig. 2 where $Eg$ and $Ig$ are the voltage and current of the secondary winding of transformer 4 and $Er$ and $Ir$ are the voltage and current of the primary winding of transformer 5. If at the given value of power transfer the voltage is too high or the current too low the relays will act to bridge contacts 21 and 21' thereby causing motors 16 and 16' to operate in such directions as to lower the line voltage. If the voltage is too low or the current too high, contacts 20 and 20' will be bridged to cause motors 16 and 16' to operate in the reverse direction thereby to change the transformer ratios and increase the voltage or decrease the current.

The operation under variable load conditions will now be apparent to those skilled in the art. Thus if the load increases the line current will at first increase approximately in proportion to the increase in load while the voltage will not change much, just as in the usual constant voltage synchronous system. This will upset the balance of the relays, causing them to bridge contacts 20 and 20' thereby causing motors 16 and 16' to operate in such directions that the contact fingers in the transformers move upwardly thereby to increase the line voltage and decrease the line current. When the predetermined ratio of voltage to current is again established the relays balance and the motors come to rest. Thus every time a load change occurs the above cycle of operation takes place to maintain constant at a predetermined value to ratio of line voltage to line current.

Below is given a table showing the relation of power transfer, voltage and current in percentages over a wide range of operation in the above manner.

| Power transfer | Line voltage | Line current |
|---|---|---|
| 144 | 120 | 120 |
| 100 | 100 | 100 |
| 81 | 90 | 90 |
| 64 | 80 | 80 |
| 49 | 70 | 70 |
| 36 | 60 | 60 |
| 25 | 50 | 50 |
| 10 | 33 | 33 |

This table shows that the voltage and current vary as the square root of the power transfer. One result of operation in this manner is that the energy efficiency of the line will be the same at all loads whereas in the usual constant voltage system the losses increase as the square of the power transfer rather than in direct proportion to the power transfer as in the present case.

As the current and voltage will be in phase along the line, the power factor will be the same at each end of the line. Furthermore, the voltage regulation of the line will be greatly improved over a constant voltage system for in such a system a large inductive reactance voltage drop occurs between no load and full load.

The synchronous stability of long lines operating near their static stability limits, when operating according to my invention, will depend upon the speed of operation of the transformer ratio changing means. When a system is operating near its static stability limits a sudden application of load, such as a short circuit or such as is often produced by switching operations, causes a sudden increase in current in the synchronous machines. This sudden current increase induces a transient increase in field current in the machines with the result that they are momentarily "stiffened", so to speak, and do not at once break out of synchronism. If the transformer ratio can be changed rapidly enough it is therefore possible to increase considerably the range of operation.

At low values of power transfer it is obviously not as important to preserve the predetermined ratio of line voltage to line current and consequently the transformer ratio changing means need not operate over as wide a range as would theoretically be necessary. Thus at values of power transfer below fifty per cent the operation can be made to merge into a constant voltage system if desired.

Although I have shown and described an embodiment of my invention in which two constant voltage machines operate a line through variable ratio transformers, it will be apparent to those skilled in the art that my invention is not limited to this particular arrangement and that if desired a variable voltage machine can be substituted for a constant voltage machine and its associated variable ratio transformer without departing from my invention in its broader aspects.

With the line operating at unity power factor with the above defined balanced ratio of voltage to current the phase displacement of a 60 cycle voltage between points one hundred miles apart will be approximately 12 degrees. This is because the wave length, or 360 degrees, at 60 cycles is approximately 3,000 miles. Under these circumstances it is interesting to consider a 1,000 mile, 60 cycle, three-phase loop. Let the phases be designated as A, B and C. The receiver voltage of phase A will be 120 degrees out of phase with its transmitter voltage. It will therefore be in phase with the transmitter voltage of phase B. Consequently the end of phase A can be connected to the beginning of phase B. Likewise the ends of phases B and C can be connected to the beginnings of phases C and A respectively to form a 1,000 mile three-phase one wire loop. With such a loop, excitation, either single phase or three phase, may be supplied at any point and a three-phase voltage will appear throughout the line.

In Fig. 3 are shown the current and voltage relations of a line which has no capacitance and which is operating according to the principles of my invention, the power factor being adjusted for zero line voltage drop. As shown, the voltage E$g$ of the generator end of the line equals the voltage E$r$ of the receiver end of the line, and so long as the power factor and ratio of voltage to current is maintained constant these voltages will remain equal.

In Fig. 4 the line has considerable capacitive energy associated with it, as shown by the phase displacement of the currents I$g$ and I$r$. However, this energy does not equal the inductive energy associated with the line, as in Fig. 2. The power factor has been so adjusted that with the line operating according to my invention the voltages at each end of the line will remain equal.

Fig. 5 differs from Fig. 4 in that the power factor is such that a constant per cent voltage drop is maintained in the line for all values of power flow.

While I have shown and described a particular embodiment of my invention it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United Sates is:—

1. The method of operating a synchronous-to-synchronous power transmission system having step up and step down power transformers which comprises varying the ratios of the step up and step down power transformers so as to keep the ratio of line voltage to line current constant at different values of power transfer.

2. In combination, an electrical power transmission line, substantially constant voltage alternating current terminal apparatus connected to each end of said line for producing a flow of power therethrough, means for varying the voltage of said line, and means responsive to the current in said line for causing said voltage varying means to vary the voltage of the line in proportion to the square root of the power flow through said line.

3. In combination, an electrical power transmission line, substantially constant voltage alternating current terminal apparatus connected to each end of said line for producing a flow of power therethrough, means for varying the current of said line, and means responsive to the voltage of said line for causing said current varying means to vary the current of the line in proportion to the square root of the power flow through said line.

4. In combination, an electrical power transmission line, substantially constant voltage alternating current terminal apparatus connected to each end of said line for producing a flow of power therethrough, means for changing the voltage and current of said line, and means responsive to both voltage and current of said line for causing said voltage and current changing means to maintain a substantially constant ratio between the line voltage and line current over a wide range of power flow through said line.

5. In combination, a transmission line, means for varying the voltage of said line, substantially constant voltage alternating current power generating and absorbing apparatus connected to opposite ends of said line for producing a flow of power therethrough, and means connected with said voltage varying means for making the voltage of said line of such a value that the reactive energy associated with said line which is due to the natural capacitance of the line is equal in magnitude to the reactive energy associated with said line which is due to the self inductance of said line over a wide range of power flow through said line.

6. In combination, a simple single outgoing and return conductor per circuit electrical transmission line, means for varying the voltage of said line, substantially constant voltage alternating current generating and receiving apparatus connected to opposite ends of said line for producing a flow of power therethrough, and means for operating said voltage varying means in a manner to maintain the ratio of line voltage to line current at such a value that the capacitive and inductive reactive energies associated with said line are equal in magnitude over a wide range of power flow through said circuit.

7. In combination, a transmission line, a generating station including a constant voltage synchronous generator and a step-up transformer connected to one end of said line, a receiving station including a constant voltage, unity power factor operated synchronous motor and a step-down transformer connected to the other end of said line, and means including differential relays connected to be responsive to the voltage and current of said line for varying the ratios of said transformers so as to main a constant ratio between the current and voltage of said line over a wide range of power flow through said line.

8. In an electrical power transmitting system, a substantially constant voltage alternating current generator, a transmission line, a step-up transformer connecting said generator to said line, and means for changing the ratio of said transformer in such a manner that the ratio of line voltage to line current is constant over a wide range of powers supplied by said generator to said line.

9. An electrical power transmission system including a constant voltage alternating current dynamo electric machine, a transmission line, a transformer connecting said machine to said line and means for varying the ratio of said transformer with variations in power flow therethrough in such a manner that the ratio of line voltage to line current remains constant at such a value that the reactive energy associated with the line which is due to the charging current of the line is equal to the reactive energy associated with the line which is due to the inductive reactance voltage drop in the line.

10. An electrical transformer having means for changing its ratio, and means operative with changes in power flow through said transformer for operating said ratio changing means in such a manner that if constant voltage is maintained on one side of said transformer the voltage on the other side will vary in proportion to the square root of the power flow therethrough.

11. In an electrical power transmission system, a power transformer having a high voltage side and a low voltage side, and means responsive to the voltage and current of said high voltage side for automatically varying the ratio of said transformer in such a manner that if constant voltage is maintained on the low voltage side a constant ratio of voltage to current will be maintained on the high voltage side over a wide range of power flow through said transformer.

LOUIS F. BLUME.